United States Patent [19]
Bernstein

[11] Patent Number: 5,641,257
[45] Date of Patent: Jun. 24, 1997

[54] SLIDING CLAMP

[75] Inventor: Leon M. Bernstein, Minnetonka, Minn.

[73] Assignee: Kurt Manufacturing Company, Inc., Fridley, Minn.

[21] Appl. No.: 439,989

[22] Filed: May 12, 1995

Related U.S. Application Data

[63] Continuation-in-part of Ser. No. 201,795, Feb. 25, 1994, abandoned, which is a continuation-in-part of Ser. No. 939,070, Sep. 1, 1992, Pat. No. 5,310,299.

[51] Int. Cl.⁶ .................... F16B 19/00; B25B 1/08; B25B 5/08
[52] U.S. Cl. .................. 411/354; 411/393; 269/232; 269/234
[58] Field of Search ................. 411/191, 192, 411/354, 393; 269/232, 233, 234, 235, 305; 403/343

[56] References Cited

U.S. PATENT DOCUMENTS

| | | | |
|---|---|---|---|
| D. 302,277 | 7/1989 | Bishop | D15/140 |
| 449,039 | 3/1891 | Fietsch, Jr. | 269/235 |
| 744,559 | 11/1903 | Kendrick | 269/234 |
| 1,017,846 | 2/1912 | Budlong | 269/229 X |
| 1,102,814 | 7/1914 | Streit . | |
| 1,685,899 | 10/1928 | Andrew . | |
| 2,000,239 | 5/1935 | Linn | 269/229 |
| 2,092,372 | 9/1937 | Goeller | 269/234 |
| 2,430,613 | 11/1947 | Hodge | 411/354 |
| 2,587,025 | 2/1952 | Beck et al. | 90/61 |
| 2,625,861 | 1/1953 | Swanson | 269/234 |
| 3,473,420 | 10/1969 | Boggs | 77/63 |
| 3,866,898 | 2/1975 | Spengler | 269/138 |
| 3,893,813 | 7/1975 | Johnson | 23/292 |
| 4,139,188 | 2/1979 | Avedian | 269/229 |
| 4,804,171 | 2/1989 | Dornfield | 269/234 |
| 4,805,888 | 2/1989 | Bishop | 269/99 |
| 5,035,411 | 7/1991 | Daines et al. | 269/231 |

OTHER PUBLICATIONS

Brochure: "Meeting the Needs of Our Customers", Mitee-Bite© Products Company, Center Ossipee, New Hampshire, pp. 1, 3, 7.

*Primary Examiner*—Neill R. Wilson
*Attorney, Agent, or Firm*—Westman, Champlin & Kelly, P.A.

[57] ABSTRACT

A device for holding a workpiece or part in a desired position. The device has a platen with a stop, a threaded shank actuator and a sliding clamping member. The actuator has a tapered head which engages an inner bearing surface of the sliding clamping member to simultaneously apply clamping forces against a workpiece and securing forces to anchor the sliding clamp member to the platen. A spring element joined to the clamping member retracts the clamping member away from the workpiece.

20 Claims, 5 Drawing Sheets

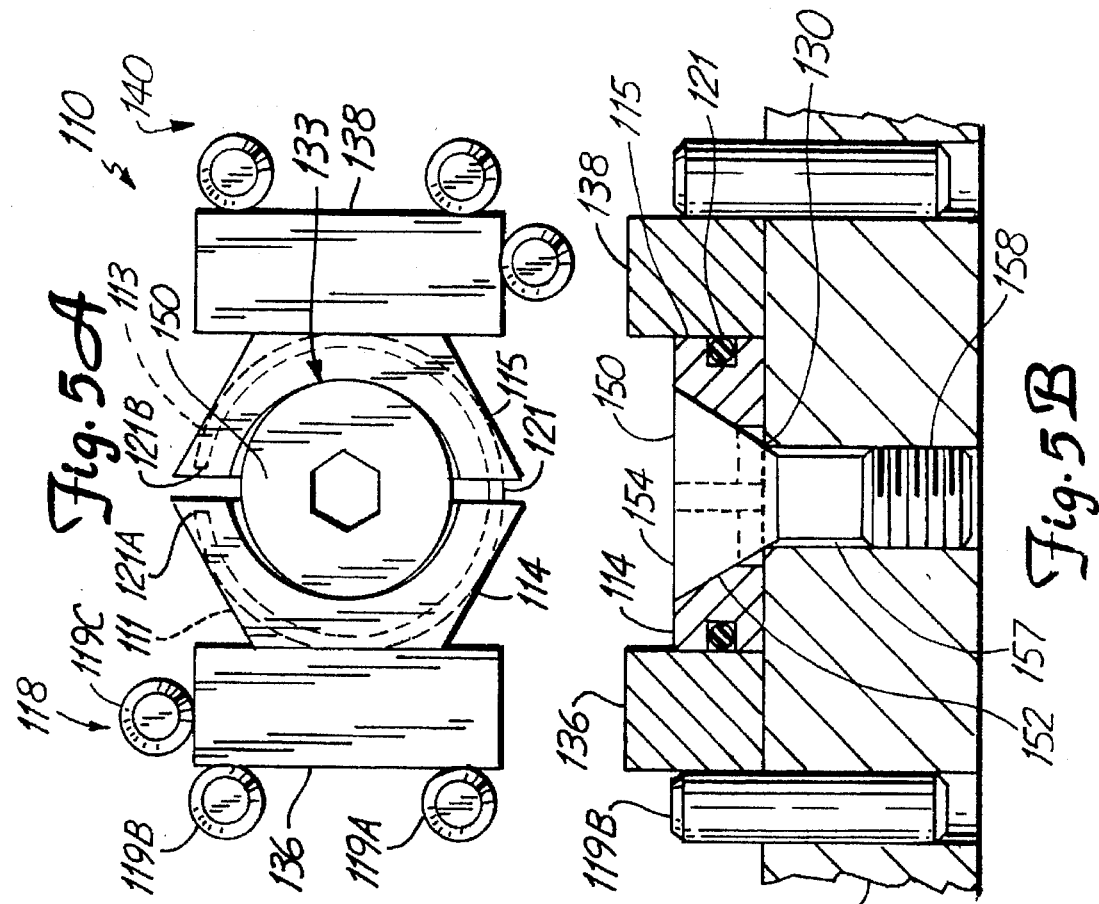
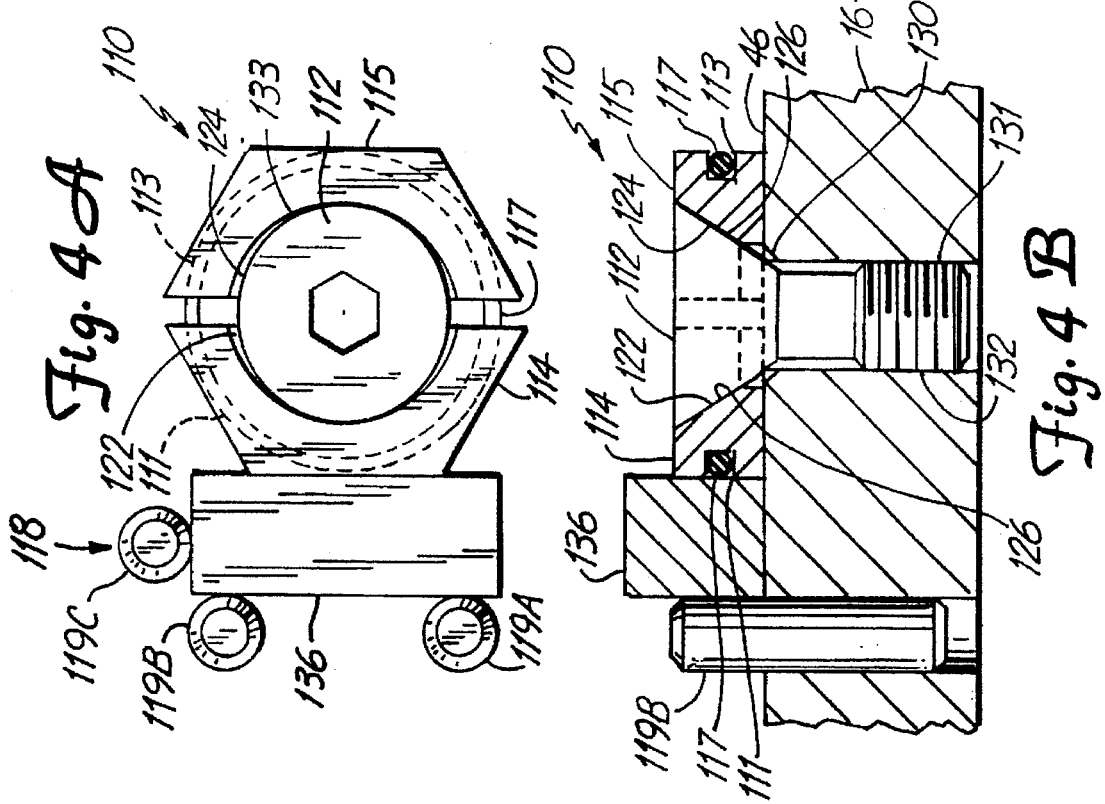

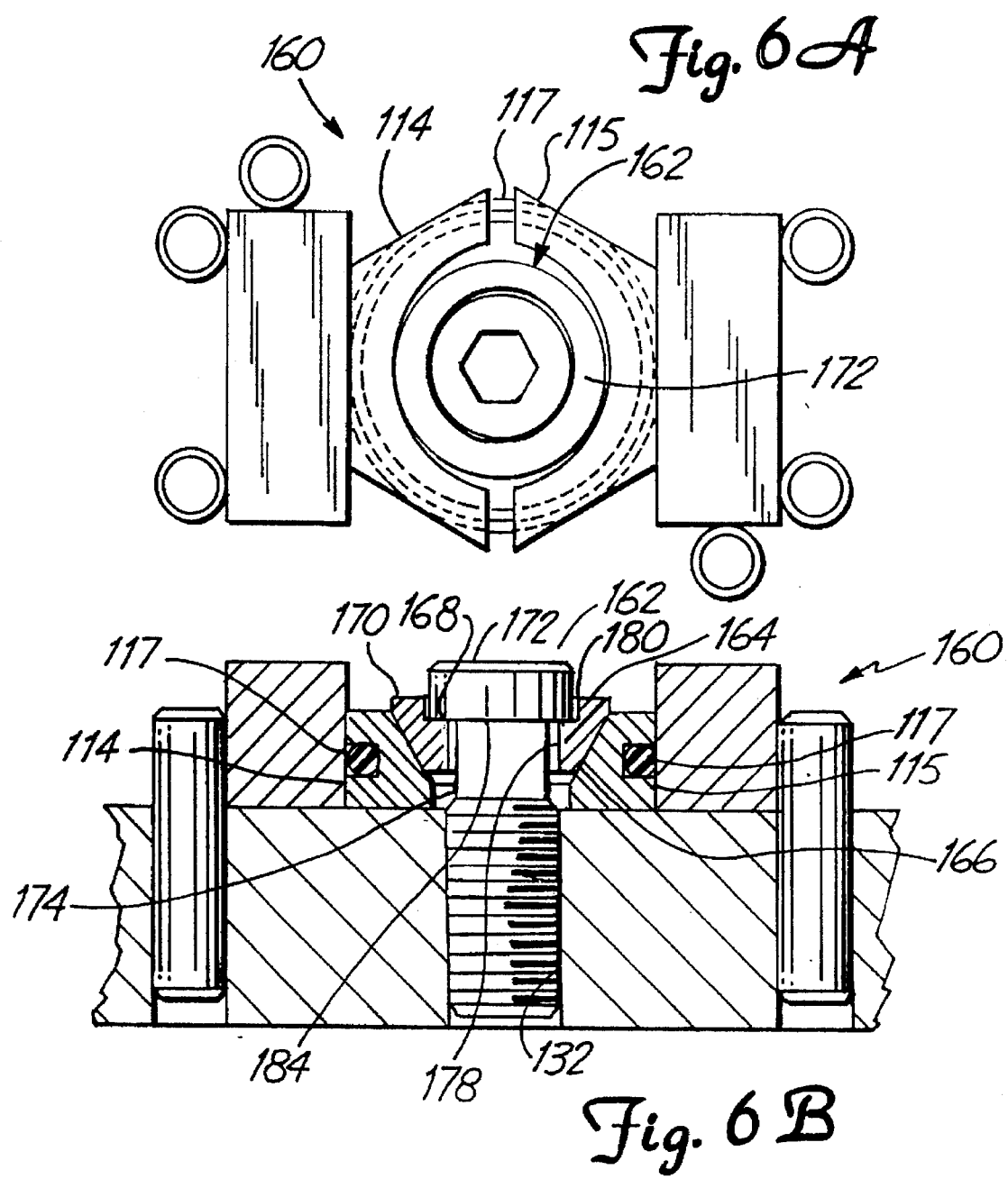

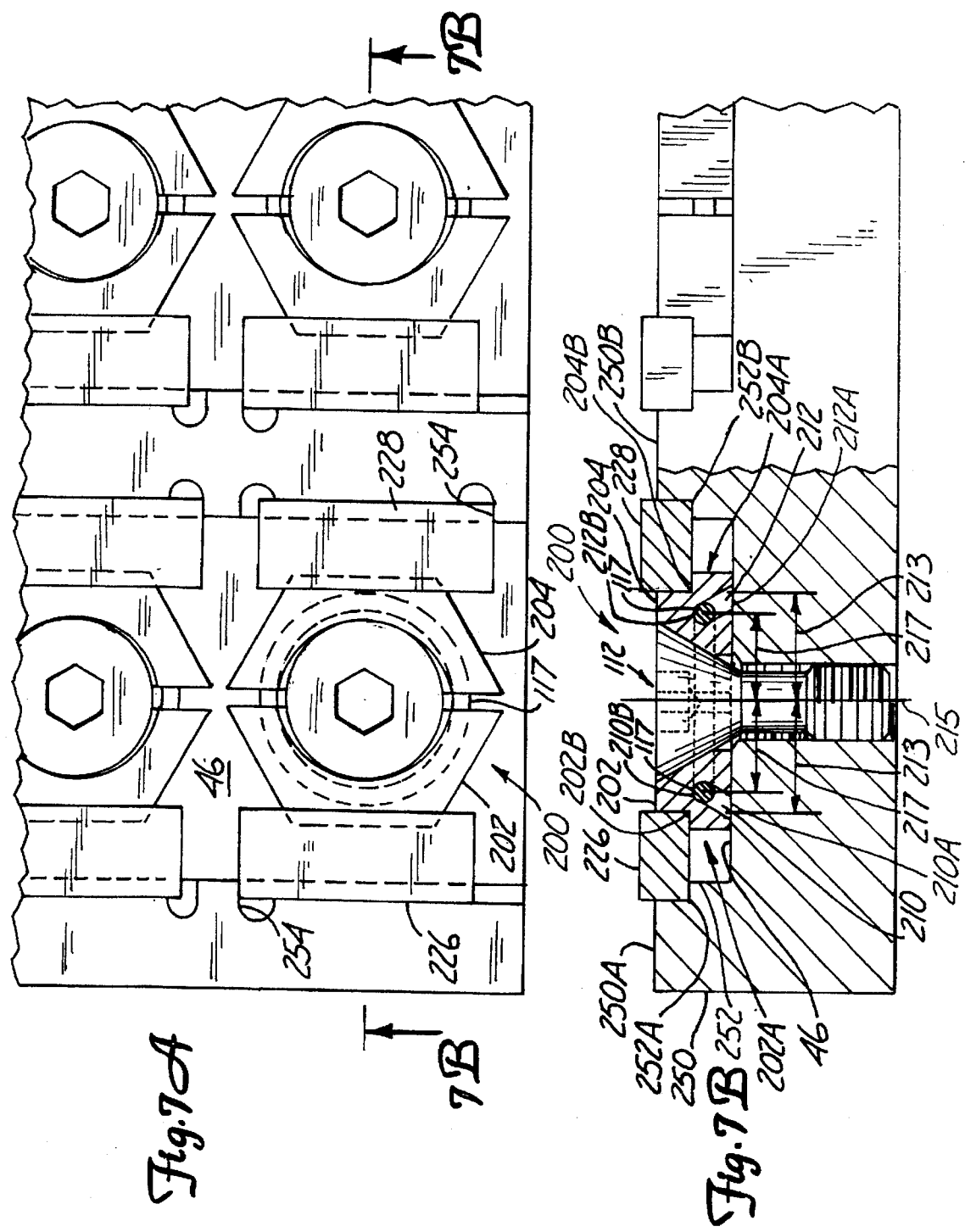

5,641,257

SLIDING CLAMP

CROSS REFERENCE TO RELATED APPLICATIONS

This application is a continuation-in-part of application Ser. No. 08/201,795, filed Feb. 25, 1994, now abandoned, which is a continuation-in-part of application Ser. No. 07/939,070, filed Sep. 1, 1992, now issued as U.S. Pat. No. 5,310,299.

BACKGROUND OF THE INVENTION

The present invention relates to a device for securely holding a workpiece or a part. More particularly, the present invention relates to a device having a clamping action provided by a sliding member which engages and urges the workpiece against a stop.

Many mechanical operations require that one or more workpieces be held stationary for a period of time. Various types of clamps and other devices are known in the art for securing a workpiece in a desired position to facilitate an operation on the workpiece.

An apparatus for securing one or more workpieces is shown in Bishop U.S. Pat. No. 4,805,888, issued Feb. 21, 1989. The Bishop patent describes an orbital action clamp comprised of a bolt-like member, a sliding clamp member and a mounting platen. The bolt-like member is formed of a threaded shaft and an eccentric head. The sliding clamp member has a centered through bore adapted to receive the shaft of the bolt-like member. A larger bore, concentric with the through bore, accepts the head and provides a shoulder such that the head will nest within the larger bore. The threaded section of the bolt-like member engages a threaded bore in the mounting platen.

Rotation of the Bishop bolt-like member results in an orbital action by the head. That is, rotation of the eccentric head within the clamp member produces a camming action against a wall of the large bore of the clamp member. This camming action produces motion of the clamp member in two directions. The first motion is against the stop, while the second is across the clamping surface.

In most cases, the Bishop clamp member will be fully engaged with the workpiece without being securely anchored to the platen. In some cases, the head will tighten against the shoulder of the clamp member before the workpiece is clamped to the stop.

SUMMARY OF THE INVENTION

The present invention provides a device having a straight sliding clamp member which fully engages a workpiece against a stop while being simultaneously anchored to a platen. The clamping device is comprised of an actuator-fastener, a clamping member and a platen.

The fastener may be a standard flat-head bolt formed with a threaded shaft and a tapered head, the taper forming an outer peripheral bearing surface. Preferably, the tapered surfaces or curved side surfaces have a contact angle between 30° and 45° as measured from the longitudinal axis of the fastener. The clamping member has a through bore adapted to receive the threaded shaft. A conical bore, concentric with and larger than the through bore, accepts the head and provides an inner peripheral bearing surface. The threaded shaft of the fastener engages a threaded bore in the platen.

The clamping member has a clamping surface, which may have different shapes to clamp different types of workpieces. For example, the clamping member can be rectangular, square, hexagonal, triangular or round. In addition, the clamping member can clamp two parts simultaneously when the conical bore is positioned between the parts. The clamping member can rotate slightly about the conical bore such that approximately equal clamping forces are applied to each part when the fastener is tightened.

As the fastener threads are turned to engage the threads of the platen, the outer bearing surface of the tapered head is drawn toward the platen and into engagement with the inner bearing surface of the conical bore. The resulting force on the clamping member urges the clamping member toward the workpiece. The clamping member will "slide" toward the workpiece, engage the workpiece and clamp the workpiece against the stop. Simultaneously the force on the clamping member will urge the clamping member toward the platen to anchor the a clamping member to the platen when the workpiece is clamped against the stop. Generally, the clamping forces of the clamping member upon the part and the securing friction forces holding the clamping member to the platen are related to the tapered contact surfaces. For example, the clamping forces and the securing forces are approximately equal for tapered contact surfaces of 45°.

In another embodiment, the clamping member is retracted by a spring element when the actuator-fastener is loosened. Preferably, the embodiment includes a support member. The support member, like the clamping member, has an inner bearing surface that engages the outer tapered bearing surface of the actuator-fastener.

The support member slides upon the platen working surface similar to the clamping member. If desired, the support member is provided with a second clamping face that is used to clamp a second workpiece against a second stop. The spring element again retracts the clamping member and the support member away from the workpieces.

Preferably, the spring element is located in suitable recesses formed within both the clamping member and the support member. The recesses can open to any suitable surfaces of the clamping member and the support member, including their corresponding clamping surfaces. However, in a preferred embodiment, each of the recesses comprise a groove that is formed at a selected radius from the longitudinal axis of the actuator-fastener. The grooves open to the platen working surface upon which the clamping member and the support member slide. Since the openings to the grooves are effectively covered by the platen working surface, the spring element is protected from dust, oil, metal shavings, etc. in the working environment. In addition to protecting the spring element, having grooves that open to the platen working surface allows the clamping surfaces to be free of such grooves. In this manner, the clamping surfaces can be formed as desired to accommodate the intended workpieces to be clamped such as a step.

BRIEF DESCRIPTION OF THE DRAWINGS

FIG. 4A is a top view of a second embodiment of a clamping device made in accordance with the present invention.

FIG. 4B is a front sectional view of the clamping device of FIG. 4A.

FIG. 5A is a top view of the clamping device of the second embodiment clamping two opposed workpieces.

FIG. 5B is a front sectional view of the clamping device of FIG. 5A.

FIG. 6A is a top view of a third embodiment of a clamping device made in accordance with the present invention.

FIG. 6B is a front sectional view of the clamping device of FIG. 6A.

FIG. 7A is a top view of a fourth embodiment of a clamping device made in accordance with the present invention.

FIG. 7B is a front sectional view of the clamping device of FIG. 7A.

DETAILED DESCRIPTION OF THE PREFERRED EMBODIMENTS

Figure 1:
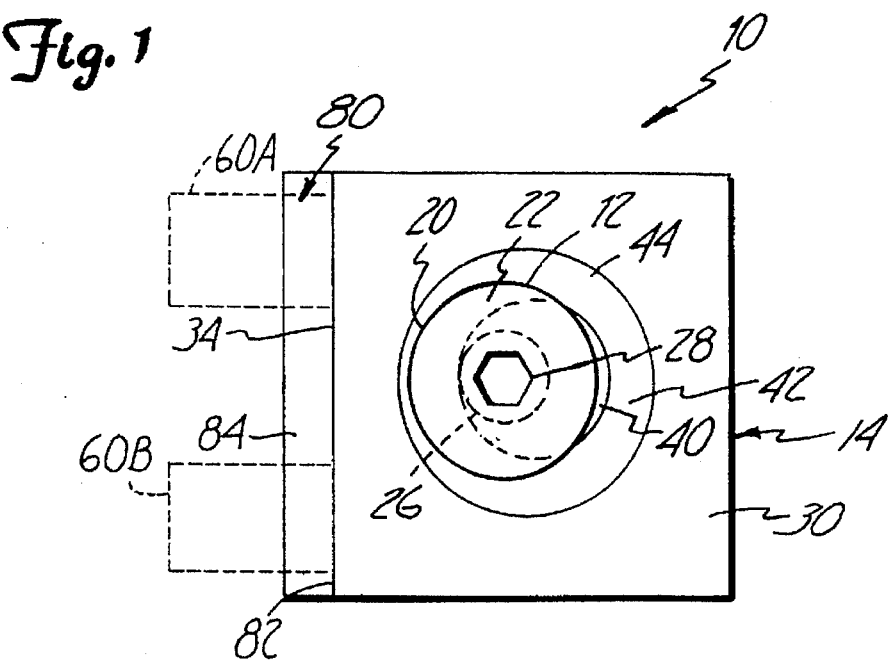
FIG. 1 is a top view of a clamping device made in accordance with the present invention.

A preferred embodiment of a clamping device in accordance with the present invention, is shown in FIG. 1 and designated generally at 10. The clamping device 10 includes a fastener 12, a clamping member 14, a platen 16 and a stop 18. The fastener 12 may be a standard flat-headed bolt having a threaded shank or shaft 26 and a tapered head 20 with a flat, top surface 22 and a taper 24. The taper 24 forms an outer peripheral bearing surface.

The clamping member 14 is a plate with a top face 30, a bottom sliding face or surface 32 and a plurality of sides. One or more notches 80 may be provided in the clamping member 14, as described more fully below.

The clamping member has a through bore 40 and a concentric conical bore 42. The conical bore 42 forms an inner peripheral bearing surface 44 which is linearly engaged by the outer tapered peripheral bearing surface 24 of the fastener 12. Preferably, the tapered surfaces have a contact angle between 30° and 45° as measured from the longitudinal axis of the fastener 12.

The platen 16 provides a mounting base having a working or sliding surface 46 from which the stop 18 extends. The stop 18 may be integrally formed with the platen 16 or may be formed as a separate member secured to the platen working surface 46. A workpiece 60 positioned on the working surface between the clamping member 14 and the stop 18 will be secured and engaged by the clamping member 14 as it moves, or is urged, toward the stop 18. Thus, the workpiece is secured at the platen working surface 46 for any desired operation on the workpiece.

The clamping device 10 is set up for use by inserting the shaft 26 of the fastener 12 through the through bore 40 in the clamping member 14 and into engagement with the threads of the threaded bore 50 of the platen 16. As the fastener 12 is turned, the threaded shaft 26 draws the outer bearing surface of the tapered head 20 into contact with the inner bearing surface of conical bore 42 at an area of contact 70. (See FIG. 2). Further turning urges the clamping member 14 toward the stop 18 while the tapered head 20 and the area of contact 70 move downward in the conical bore 42. The clamping member 14 engages and secures the workpiece 60 against the stop 18. Upon engagement of the workpiece 60 against the stop 18, the sliding clamp 30 is simultaneously anchored to the platen 16. That is, when the sliding movement of the clamping member is "stopped", by the workpiece and stop, the downward force on the clamping member will anchor the clamping member to the platen. From this it is apparent that in addition to urging the clamping member toward the stop 18, the engagement at contact area 70 also exerts a downward force on clamping member 14.

Figure 2:
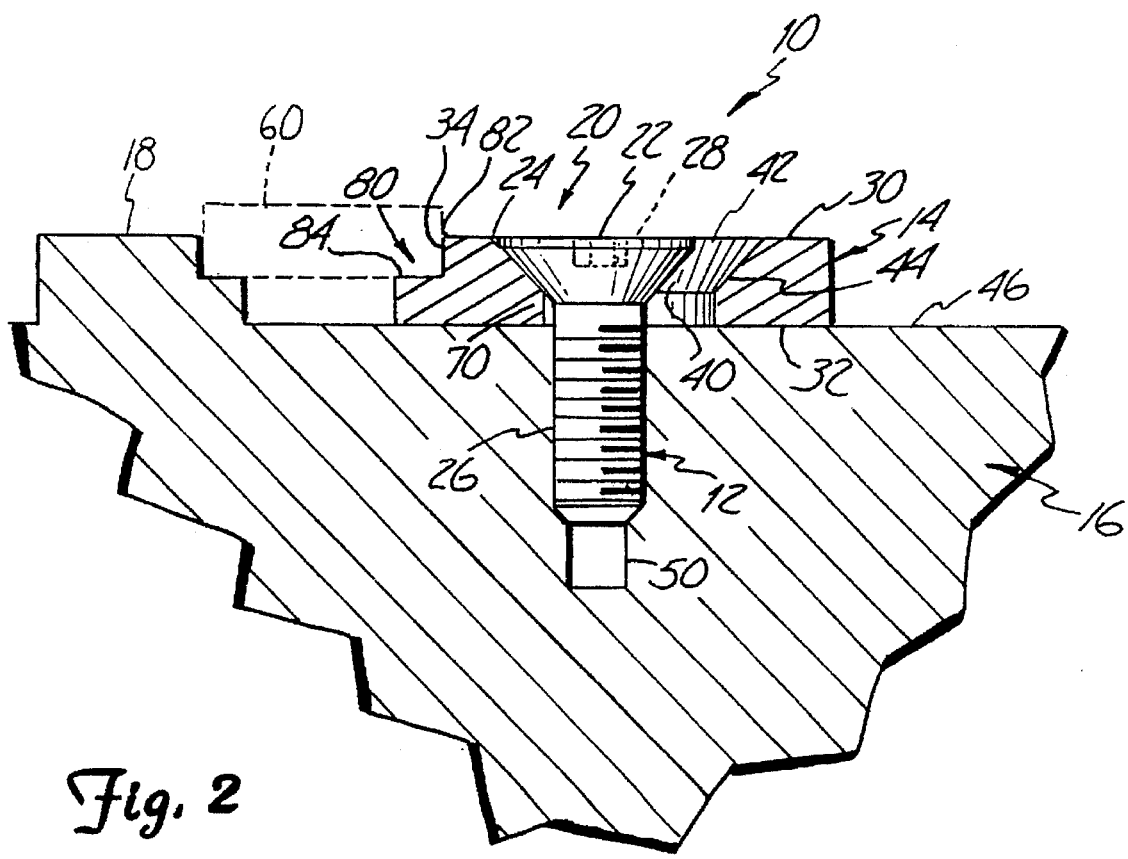
FIG. 2 is a front sectional view of the clamping device of FIG. 1.

A notch 80 may be provided on one or more sides of the clamping member 14. The notch forms a shoulder 84 on which the workpiece rests and a clamping face 34 which engages the workpiece to urge it toward the stop 18. The clamping member can be rectangular, square, hexagonal, triangular or round with the clamping face 34 suitably formed to accommodate different workpieces. A corresponding notch may appear in the stop as illustrated in FIG. 2. In addition, the clamping member 14 can clamp two parts 60A and 60B simultaneously, when the axis of the conical bore 42 is positioned between the parts 60A and 60B. The clamping member 14 can then rotate slightly about the conical bore 42 such that approximately equal clamping forces are applied to each part when the fastener 12 is tightened.

In one embodiment, the top surface 22 of the fastener head 20 has a recess 28 in the shape of a hex socket adapted for turning using an Allen wrench. Alternatively, the top surface 22 may have a slot or other recess head suitable for engagement by a conventional slotted or Phillips-type screwdriver.

As noted above, the stop 18 may be unitary with the platen 16 or a separate member secured to the platen 16. A second clamping device anchored in the platen, as described above, may serve as the stop 18.

Figure 3:
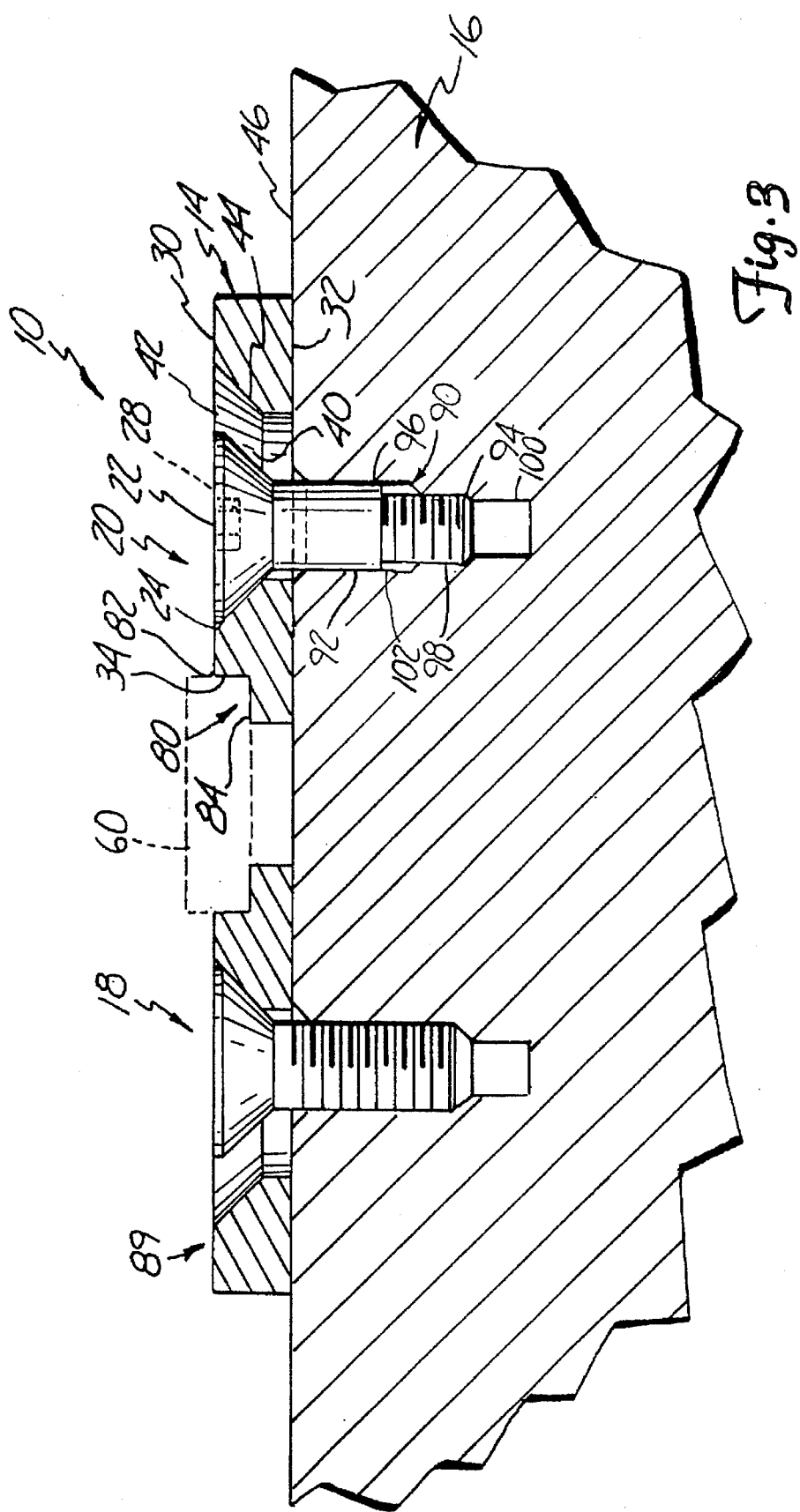
FIG. 3 is a front sectional view of the clamping device having an alternative fastener.

FIG. 3 illustrates the clamping device 10 with an alternative fastener 90. The fastener 90 is similar to the fastener 10 in that it has the head 20 with the tapered side surfaces 24. However, the fastener 90 has a shank or shaft 92 that includes a lower threaded portion 94 and an upper cylindrical portion 96. The lower threaded portion 94 mates with corresponding threads in a lower portion 98 of a bore 100, while the upper cylindrical portion 96 slides within a cylindrical upper portion 102 of the bore 100. The upper cylindrical portion 96 improves the rigidity of the fastener 90 over that of the fastener 12 since the minor diameter for the threads are not present. Preferably, the length of the upper cylindrical portion 96 is approximately one to one and a half times the diameter of the shaft 92. The lower threaded portion 94 provides an actuator to draw the tapered head 20 downward. As described above, a second clamping device 89 anchored in the platen 16 may serve as the stop 18.

Another embodiment of a clamping device in accordance with the present invention is shown in FIGS. 4A, 4B, 5A and 5B designated generally at 110. The clamping device 110 includes a fastener 112, a clamping member 114, a support member 115 and a spring element 117. The platen 16 includes a stop 118 (herein illustrated as a plurality of stop pins 119A, 119B and 119C.)

Referring to FIG. 4B, the spring element 117 joins the clamping member 114 and the support member 115 to the fastener 112. When the fastener 112 is turned and lifted from the platen working surface 46, the spring element 117 retracts the clamping member 114 away from a workpiece 136. Preferably, the spring element 117 comprises an endless band made from an elastomeric material such as rubber. Other spring elements such as a snap ring 121 (illustrated in FIGS. 5A and 5B) formed from, for example, steel snap wire are also suitable. The snap ring 121 has separated ends 121A and 121B. The spring element 117 and snap ring 121 are located in grooves 111 and 113 of the clamping member 114 and the support member 115, respectively, which are substantially co-planer.

The clamping member 114 and the support member 115 each have an inner peripheral bearing surface 122 and 124, respectively that are engaged by an outer tapered peripheral bearing surface 126 of the fastener 112. When oriented such that the inner bearing peripheral surfaces 122 and 124 generally face each other as illustrated in FIGS. 4A and 5A, the clamping member 114 and the support member 115 form a through bore 130 and a generally concentric conical bore 133. Preferably, the inner tapered surfaces 122 and 124 have a contact angle between 30° and 45° as measured from the longitudinal axis of the fastener 112.

Although the support member 115 is illustrated as being substantially identical to the clamping member 114, it should be noted that it is not necessary in that the support member 115 can take many forms with the bore 130 not being necessarily circular or symmetrical. In addition, the presence of the support member 115 is also not necessary for operation of the embodiment of FIGS. 4A and 4B in that the spring element 117 could be joined to the fastener 112 directly, for example, positioned in a suitable annular groove.

The clamping device 110 is set up for use by positioning the clamping member 114 and the support member 115 about the fastener 112. The spring element 117 holds the clamping member 114 and the support member 115 together with the tapered fastener 112 therebetween. Referring to FIG. 4B, a threaded portion 131 is then positioned in a threaded bore 132. As the fastener 112 is turned, the threaded portion 131 draws the outer bearing surface 126 of the fastener 112 toward the platen working surface 46 and into contact with the inner bearing surfaces 122 and 124. As illustrated in FIG. 4B, the clamping member 114 can be used to secure a single workpiece 136 against the stop 118, while in FIG. 5B, since contract is made uniformly between the clamping member 114 and the support member 115 (operating as a second clamping member), the clamping device 110 is well suited to secure an additional workpiece 138 against a second suitable stop 140. Although not shown in this embodiment, notches similar to notches 80 in the previous embodiment, may be provided in both the clamping member 114 and the support member 115 to secure the workpieces 136 and 138.

When used to hold two workpieces as illustrated in FIG. 5B, a fastener 150 may be preferred. The fastener 150 has a tapered concentric surface 152 located on a head 154. A shank 157 extends from the head 154 to a threaded portion 158. The threaded portion 158 mates with the threaded bore 132 provided in the platen 16. Preferably, the diameter of the shank 157 between the head 154 and the threaded portion 158 is less than the minimum diameter of the threaded bore 132. The fastener 150 will bend slightly to accommodate differences in the size of the workpieces 136 and 138.

A third embodiment of a clamping device of the present invention is illustrated in FIGS. 6A and 6B generally at 160. The clamping device 160 includes the clamping member 114, the support member 115 and the spring element 117, previously described. The clamping device 160 differs from the clamping device 110 in that it includes an actuator-fastener generally indicated at 162 which allows for greater tolerances in size between the workpieces 136 and 138 to be clamped. Specifically, the actuator-fastener 162 includes an actuator insert 164. The actuator insert 164 forms a tapered outer bearing surface 166 that engages the inner bearing surfaces of the clamping member 114 and the support member 115. The actuator insert 164 includes a flat bearing surface 168, preferably recessed from a top surface 170. A suitable bolt 172 engages the surface 168 when the bolt 172 is turned and drawn into the bore 132. A shank 174 of the bolt 172 extends through an aperture 178 in the actuator insert 164. The aperture 178 and a recess 180 are of sufficient size to allow limited movement of the actuator insert 164 relative to the fixed position of the bolt 172. This limited movement allows for variances in the size of the workpieces 136 and 138 by allowing the head 184 to slide upon the surface 168, if needed. In this manner, the clamping member 114 and the support member 115 can be at slightly different distances from a center axis of the bolt 172.

A fourth embodiment of a clamping device of the present invention is illustrated in FIGS. 7A and 7B generally at 200. The clamping device 200 includes a clamping member 202, a support member 204 (functioning as a second clamping member), and the spring element 117, previously described. The clamping device 200 differs from the clamping device 110 in that the spring element 117 is located in grooves 210 and 212 of the clamping member 202 and the support member 204, respectively, which open to the platen working surface 46 upon which the clamping member 202 and the support member 204 slide.

As illustrated, the grooves 210 and 212 each have an opening 210A and 212A, respectively, that are located at a selected radius 213 from a longitudinal axis 215 of the tapered fastener 112, previously described. The grooves 210 and 212 also include recessed inner portions 210B and 212B, respectively, that are located at a selected radius 217 from the longitudinal axis 215. Preferably, the radius 213 is greater than the radius 217. In this manner, the spring element 117 is retained in the inner portions 210B and 212B. As appreciated by one skilled in the art, other shapes of the grooves 210 and 212 can be used in place of the shape illustrated.

In addition to protecting the spring element 117, the grooves 210 and 212 allow clamping surfaces 202A and 204A to be free of the grooves such as at 111 and 113 in the previous embodiments. In this manner, the clamping surfaces 202A and 204A can be formed as desired to accommodate the intended workpieces to be clamped. In the embodiment illustrated, notches 202B and 204B are provided on the clamping surfaces 202A and 204A, respectively. The notches 202B and 204B form shoulders on which workpieces 226 and 228 can rest upon and be supported above the platen working surface 46.

In the embodiment illustrated, the platen working surface 46 is formed in a base 250 as a bottom surface of a slot 252 provided in the base 250. Upwardly extending portions form stops 250A and 250B. As illustrated, the stops 250A and 250B include notches 252A and 252B which form shoulders for the workpieces 226 and 228. Stop surfaces 254 formed by corresponding grooves that extend into the stops 250A and 250B also are provided to precisely locate the workpieces 226 and 228 when desired.

The present invention provides a device for holding a workpiece or an assembly part in which a clamping member has both transverse and axial forces imparted to it by the action of a single actuator member. In this manner, the clamping member secures a workpiece against a stop and is, itself, anchored.

Although the present invention has been described with reference to preferred embodiments, workers skilled in the art will recognize that changes may be made in form and detail without departing from the spirit and scope of the invention. For example, the inner and outer bearing surfaces are both described as tapered. Alternatively, any surface configuration may be employed for one or both of the inner and outer bearing surfaces so long as their interaction provides a contact area which imparts transverse and axial forces to the clamping members.

What is claimed is:

1. A clamping device for holding a workpiece against a stop secured to a platen, the platen having a platen working surface, the clamping device comprising:

a clamping member having a sliding face adapted for sliding movement along the platen working surface and at least one clamping face adapted to engage the workpiece;

an actuator secured into the platen along a fixed reference axis intersecting with the plate working surface and including a tapered bearing surface engaging the clamping member wherein simultaneous anchoring and moving is caused only by movement of the tapered bearing surface toward the platen working surface parallel to the reference axis; and a spring element connected to the clamping member for retracting the clamping member away from the stop.

2. The device of claim 1 wherein the spring element comprises a band made of an elastic material.

3. The device of claim 1 wherein the spring element comprises a snap ring.

4. A clamping device for holding two workpieces against stops secured to a platen, the platen having a platen working surface, the clamping device comprising:

a first clamping member having a sliding face adapted for sliding movement along the platen working surface and at least one clamping face adapted to engage a first workpiece;

a second clamping member having a sliding face adapted for sliding movement along the platen working surface and at least one clamping face adapted to engage a second workpiece;

an actuator secured into the platen for simultaneously anchoring the first and second clamping members to the platen on the platen working surface while moving the first and second clamping members toward the stops; and a spring element connected to the first and second clamping members for retracting the first and second clamping members away from the stops.

5. The device of claim 4 wherein the first and second clamping members each include an inner bearing surface, and wherein the actuator is disposed between the first and second clamping members to engage a portion of each inner bearing surface.

6. The device of claim 5 wherein the actuator comprises a fastener having a tapered head, the tapered head engaging a portion of each inner bearing surface.

7. The device of claim 4 wherein the first and second clamping members each include a recess, and wherein the spring element is located in the recesses of the first and second clamping members.

8. The device of claim 7 wherein the recesses of the first and second clamping members each open to the platen working surface.

9. The device of claim 8 wherein the recesses of the first and second clamping members each comprise a groove opening to the platen working surface.

10. The device of claim 9 wherein an opening of each of the grooves is disposed on the corresponding clamping member at a first radius from a longitudinal axis of the actuator and an inner portion of each of the grooves is formed at a second radius from the longitudinal axis of the actuator, wherein the first radius is greater than the second radius.

11. The device of claim 10 wherein the spring element is formed in a ring.

12. The device of claim 5 wherein each inner bearing surface is tapered, and wherein the actuator includes a tapered outer bearing surface with a first portion engaging the tapered inner bearing surface of the first clamping member and a second portion engaging the tapered inner bearing surface of the second clamping member.

13. The device of claim 12 wherein the actuator comprises:

an actuator insert having the tapered outer bearing surface and an aperture; and a fastener joined to the platen and having a shank extending through the aperture, the fastener selectively moving the actuator insert toward and away from the platen working surface.

14. A clamping device for holding a workpiece against a stop secured to a platen, the platen having a platen working surface, the clamping device comprising:

a clamping member having a sliding face adapted for sliding movement along the platen working surface, a clamping face adapted to engage the workpiece, and a recess opening to the clamping face;

an actuator secured into the platen for simultaneously anchoring the clamping member to the platen on the platen working surface while moving the clamping member toward the stop; and a spring element connected to the clamping member for retracting the clamping member away from the stop wherein the spring element is disposed in the recess.

15. A clamping device for holding a workpiece against a stop secured to a platen, the platen having a platen working surface, the clamping device comprising:

a clamping member having a sliding face adapted for sliding movement along the platen working surface, a clamping face adapted to engage the workpiece, and a recess opening to the sliding face;

an actuator secured into the platen for simultaneously anchoring the clamping member to the platen on the platen working surface while moving the clamping member toward the stop; and a spring element connected to the clamping member for retracting the clamping member away from the stop wherein the spring element is disposed in the recess.

16. The clamping device of claim 15 wherein an opening of the recess is disposed on the clamping member at a first radius from a longitudinal axis of the actuator and an inner portion of the recess is formed at a second radius from the longitudinal axis of the actuator, and wherein the first radius is greater than the second radius.

17. A clamping device for holding a workpiece against a stop secured to a platen, the platen having a platen working surface, the clamping device comprising:

a clamping member having a sliding face adapted for sliding movement along the platen working surface and at least one clamping face adapted to engage the workpiece;

a fastener secured into the platen defining a central axis, the fastener having a bearing surface concentrically positioned about the central axis, the bearing surface engaging the clamping member for simultaneously anchoring the clamping member to the platen on the platen working surface while moving the clamping member toward the stop; and a spring element connected to the clamping member for retracting the clamping member away from the stop.

18. The device of claim 17 wherein the fastener includes a tapered head, the tapered head defining the bearing surface.

19. The device of claim 18 further comprising a threaded bore within the platen, and wherein the fastener comprises threaded shank means for cooperation with the platen threaded bore.

20. The device of claim 19 wherein the fastener comprises a shank joining the threaded shank means to the tapered head, the shank having a diameter less than the threaded bore to prevent contact with the threaded bore.

* * * * *